United States Patent
Cao

(10) Patent No.: US 11,032,500 B2
(45) Date of Patent: Jun. 8, 2021

(54) DARK NOISE COMPENSATION IN A RADIATION DETECTOR

(71) Applicant: SHENZHEN XPECTVISION TECHNOLOGY CO., LTD., Shenzhen (CN)

(72) Inventor: Peiyan Cao, Shenzhen (CN)

(73) Assignee: SHENZHEN XPECTVISION TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 16/854,068

(22) Filed: Apr. 21, 2020

(65) Prior Publication Data
US 2020/0252561 A1 Aug. 6, 2020

Related U.S. Application Data

(63) Continuation of application No. PCT/CN2017/108243, filed on Oct. 30, 2017.

(51) Int. Cl.
*H04N 5/361* (2011.01)
*G06T 7/00* (2017.01)
*H04N 5/32* (2006.01)

(52) U.S. Cl.
CPC .......... *H04N 5/361* (2013.01); *G06T 7/0012* (2013.01); *H04N 5/32* (2013.01); *G06T 2207/10116* (2013.01); *G06T 2207/30004* (2013.01)

(58) Field of Classification Search
CPC ........ H04N 5/361; H04N 5/32; G06T 7/0012; G06T 2207/10116; G06T 2207/30004
See application file for complete search history.

(56) References Cited

U.S. PATENT DOCUMENTS

| 4,293,877 A | * | 10/1981 | Tsunekawa | .............. | G02B 7/36 257/229 |
| 5,033,100 A | | 7/1991 | Hara et al. | | |

(Continued)

FOREIGN PATENT DOCUMENTS

| CN | 102348073 A | 2/2012 |
| CN | 102544032 A | 7/2012 |

(Continued)

OTHER PUBLICATIONS

Clintberg, B., "Lesson 44: Frequency, Wavelength, & Amplitude", Mr. Clintberg's Studyphysics!, Internet Archive Wayback Machine: https://web.archive.org/web/20061002104401/http://www.studyphysics.ca/newnotes/20/unit03_mechanicalwaves/chp141516_waves/lesson44.htm (Year: 2006).*

(Continued)

*Primary Examiner* — Blake C Riddick
(74) *Attorney, Agent, or Firm* — IPro, PLLC

(57) ABSTRACT

Disclosed herein is a radiation detector, comprising: pixels arranged in an array, the pixels comprising peripheral pixels at a periphery of the array and interior pixels at an interior of the array, each of the pixels configured to generate an electrical signal on an electrode thereof, upon exposure to a radiation; an electronic system configured to provide first compensation to the peripheral pixels for a dark noise of the peripheral pixels and to provide second compensation to the interior pixels for a dark noise of the interior pixels, the first compensation and the second compensation being different.

24 Claims, 18 Drawing Sheets

(56) References Cited

U.S. PATENT DOCUMENTS

| | | | | |
|---|---|---|---|---|
| 6,034,406 | A * | 3/2000 | Kobayashi | H01L 27/14603 257/435 |
| 2006/0268135 | A1* | 11/2006 | Lim | H04N 5/361 348/243 |
| 2007/0003006 | A1* | 1/2007 | Tkaczyk | G01T 1/243 378/19 |
| 2008/0029788 | A1* | 2/2008 | Inoue | H04N 5/335 257/233 |
| 2010/0020924 | A1* | 1/2010 | Steadman Booker | G01T 1/17 378/19 |
| 2012/0018627 | A1* | 1/2012 | Tredwell | H04N 5/361 250/252.1 |
| 2012/0146016 | A1* | 6/2012 | Park | H01L 23/481 257/42 |
| 2014/0001341 | A1* | 1/2014 | Hassibi | G01N 21/6454 250/208.2 |
| 2014/0014818 | A1* | 1/2014 | Cho | H01L 27/14603 250/208.1 |
| 2014/0334600 | A1* | 11/2014 | Lee | A61B 6/482 378/62 |
| 2015/0281620 | A1* | 10/2015 | Usuda | H04N 5/357 250/208.1 |
| 2016/0070003 | A1* | 3/2016 | Haiun | A61B 6/542 250/366 |
| 2016/0182840 | A1* | 6/2016 | Iwasaki | H04N 5/365 348/243 |
| 2016/0295139 | A1* | 10/2016 | Ishii | H01L 27/14607 |
| 2017/0350990 | A1* | 12/2017 | Chmeissani Raad | G01T 1/366 |
| 2018/0192977 | A1* | 7/2018 | Jin | A61B 6/585 |
| 2018/0220091 | A1* | 8/2018 | Ikedo | H04N 5/3572 |
| 2018/0321395 | A1* | 11/2018 | Steadman Booker | G01T 1/244 |

FOREIGN PATENT DOCUMENTS

| | | |
|---|---|---|
| CN | 104885222 A | 9/2015 |
| KR | 100886973 B1 | 3/2009 |
| KR | 1020150002965 A1 | 1/2015 |
| NO | 2008038177 A1 | 4/2008 |
| NO | 2016161544 A1 | 10/2016 |

OTHER PUBLICATIONS

PCT/CN2017/108243 ISA210 ISR Mailing Date Jul. 19, 2018.

* cited by examiner

DARK NOISE COMPENSATION IN A RADIATION DETECTOR

TECHNICAL FIELD

The disclosure herein relates to methods and apparatuses for compensating for the effect of dark noise in a radiation detector.

BACKGROUND

A radiation detector is a device that measures a property of a radiation. Examples of the property may include a spatial distribution of the intensity, phase, and polarization of the radiation. The radiation may be one that has interacted with a subject. For example, the radiation measured by the radiation detector may be a radiation that has penetrated or reflected from the subject. The radiation may be an electromagnetic radiation such as infrared light, visible light, ultraviolet light, X-ray or γ-ray. The radiation may be of other types such as α-rays and β-rays.

One type of radiation detectors is based on interaction between the radiation and a semiconductor. For example, a radiation detector of this type may have a semiconductor layer that absorbs the radiation and generate charge carriers (e.g., electrons and holes) and circuitry for detecting the charge carriers.

Radiation detectors may be negatively impacted by "dark" noise (e.g., dark current). Dark noise in a radiation detector includes physical effects present even if no radiation the radiation detector is configured to detect is incident on the radiation detector. Isolating or reducing the impact of the dark noise to the overall signals detected by the radiation detector is helpful to make the radiation detector more useful.

SUMMARY

Disclosed herein is a radiation detector, comprising: pixels arranged in an array, the pixels comprising peripheral pixels at a periphery of the array and interior pixels at an interior of the array, each of the pixels configured to generate an electrical signal on an electrode thereof, upon exposure to a radiation; an electronic system configured to provide first compensation to the peripheral pixels for a dark noise of the peripheral pixels and to provide second compensation to the interior pixels for a dark noise of the interior pixels, the first compensation and the second compensation being different.

According to an embodiment, the electronic system is configured to provide the first compensation by providing a first electric current to the peripheral pixels and to provide the second compensation by providing a second electric current to the interior pixels, the first electric current and the second electric current being different.

According to an embodiment, the first electric current and the second electric current are different in magnitudes thereof, in waveforms thereof, or in frequencies thereof.

According to an embodiment, a magnitude of the first electric current is at least 10 times larger than a magnitude of the second electric current.

According to an embodiment, the radiation is X-ray.

According to an embodiment, each of the pixels comprises a radiation absorption layer and an electrode; wherein the electronic system comprises: a first voltage comparator configured to compare a voltage of the electrode to a first threshold; a second voltage comparator configured to compare the voltage to a second threshold; a counter configured to register a number of radiation particles absorbed by the radiation absorption layer; a controller; wherein the controller is configured to start a time delay from a time at which the first voltage comparator determines that an absolute value of the voltage equals or exceeds an absolute value of the first threshold; wherein the controller is configured to activate the second voltage comparator during the time delay; wherein the controller is configured to cause the number registered by the counter to increase by one, if the second voltage comparator determines that an absolute value of the voltage equals or exceeds an absolute value of the second threshold.

According to an embodiment, the controller is configured to activate the second voltage comparator at a beginning or expiration of the time delay.

According to an embodiment, the radiation detector further comprises a voltmeter, wherein the controller is configured to cause the voltmeter to measure the voltage upon expiration of the time delay.

According to an embodiment, the controller is configured to determine a radiation particle energy based on a value of the voltage measured upon expiration of the time delay.

According to an embodiment, the controller is configured to connect the electrode to an electrical ground.

According to an embodiment, a rate of change of the voltage is substantially zero at expiration of the time delay.

According to an embodiment, a rate of change of the voltage is substantially non-zero at expiration of the time delay.

According to an embodiment, each of the pixels comprises a diode or a resistor.

According to an embodiment, each of the pixels comprises silicon, germanium, GaAs, CdTe, CdZnTe, or a combination thereof.

According to an embodiment, the radiation detector does not comprise a scintillator.

Disclosed herein is a radiation detector, comprising: pixels arranged in an array, the pixels comprising peripheral pixels at a periphery of the array and interior pixels at an interior of the array, each of the pixels configured to generate an electrical signal on an electrode thereof, upon exposure to a radiation, each of the pixels comprising a radiation absorption layer and an electrode;
an electronic system comprising: a first voltage comparator configured to compare a voltage of the electrode to a first threshold; a second voltage comparator configured to compare the voltage to a second threshold; a counter configured to register a number of radiation particles absorbed by the radiation absorption layer; a controller;
wherein the controller is configured to start a time delay from a time at which the first voltage comparator determines that an absolute value of the voltage equals or exceeds an absolute value of the first threshold; wherein the controller is configured to activate the second voltage comparator during the time delay; wherein the controller is configured to cause the number registered by the counter to increase by one, if the second voltage comparator determines that an absolute value of the voltage equals or exceeds an absolute value of the second threshold;
wherein the electronic system is configured to apply different magnitudes of the second threshold for the peripheral pixels and the interior pixels.

According to an embodiment, the controller is configured to activate the second voltage comparator at a beginning or expiration of the time delay.

According to an embodiment, the radiation detector further comprises a voltmeter, wherein the controller is configured to cause the voltmeter to measure the voltage upon expiration of the time delay.

According to an embodiment, the controller is configured to determine a radiation particle energy based on a value of the voltage measured upon expiration of the time delay.

According to an embodiment, the controller is configured to connect the electrode to an electrical ground.

According to an embodiment, a rate of change of the voltage is substantially zero at expiration of the time delay.

According to an embodiment, a rate of change of the voltage is substantially non-zero at expiration of the time delay.

According to an embodiment, the absolute value of the second threshold for the peripheral pixels is higher than the absolute value of the second threshold for the interior pixels.

Disclosed herein is a system comprising any radiation detector above and an X-ray source, wherein the system is configured to perform X-ray radiography on human chest or abdomen.

Disclosed herein is a system comprising any radiation detector above and an X-ray source, wherein the system is configured to perform X-ray radiography on human mouth.

Disclosed herein is a cargo scanning or non-intrusive inspection (NII) system, comprising any radiation detector above and an X-ray source, wherein the cargo scanning or non-intrusive inspection (NII) system is configured to form an image using backscattered X-ray.

Disclosed herein is a cargo scanning or non-intrusive inspection (Nil) system, comprising any radiation detector above and an X-ray source, wherein the cargo scanning or non-intrusive inspection (Nil) system is configured to form an image using X-ray transmitted through an object inspected.

Disclosed herein is a full-body scanner system comprising any radiation detector above and a radiation source.

Disclosed herein is a computed tomography (CT) system comprising any radiation detector above and a radiation source.

Disclosed herein is an electron microscope comprising any radiation detector above, an electron source and an electronic optical system.

Disclosed herein is a system comprising any radiation detector above, wherein the system is an X-ray telescope, or an X-ray microscopy, or wherein the system is configured to perform mammography, industrial defect detection, microradiography, casting inspection, weld inspection, or digital subtraction angiography.

Disclosed herein is a method of using a radiation detector, wherein the radiation detector comprises pixels arranged in an array, the pixels comprising peripheral pixels at a periphery of the array and interior pixels at an interior of the array, each of the pixels configured to generate an electrical signal on an electrode thereof, upon exposure to a radiation; the method comprising: determining a contribution of a first dark noise in the electrical signals of the peripheral pixels; determining a contribution of a second dark noise in the electrical signals of the interior pixels; determining a first compensatory signal based on the contribution of the first dark noise, and a second compensatory signal based on the contribution of the second dark noise; and compensating the electrical signals of the peripheral pixels for the first dark noise with the first compensatory signal and compensating the electrical signals of the interior pixels for the second dark noise with the second compensatory signal; wherein the first compensatory signal and the second compensatory signal are different.

According to an embodiment, the contribution of the first dark noise or the contribution of the first dark noise is determined by measuring the electrical signal while the radiation detector receives no radiation.

According to an embodiment, the first compensatory signal and the second compensatory signal are electric currents.

According to an embodiment, the first compensatory signal and the second compensatory signal are different in magnitudes thereof, or in waveforms thereof, or in frequencies thereof.

DETAILED DESCRIPTION

Figure 1:
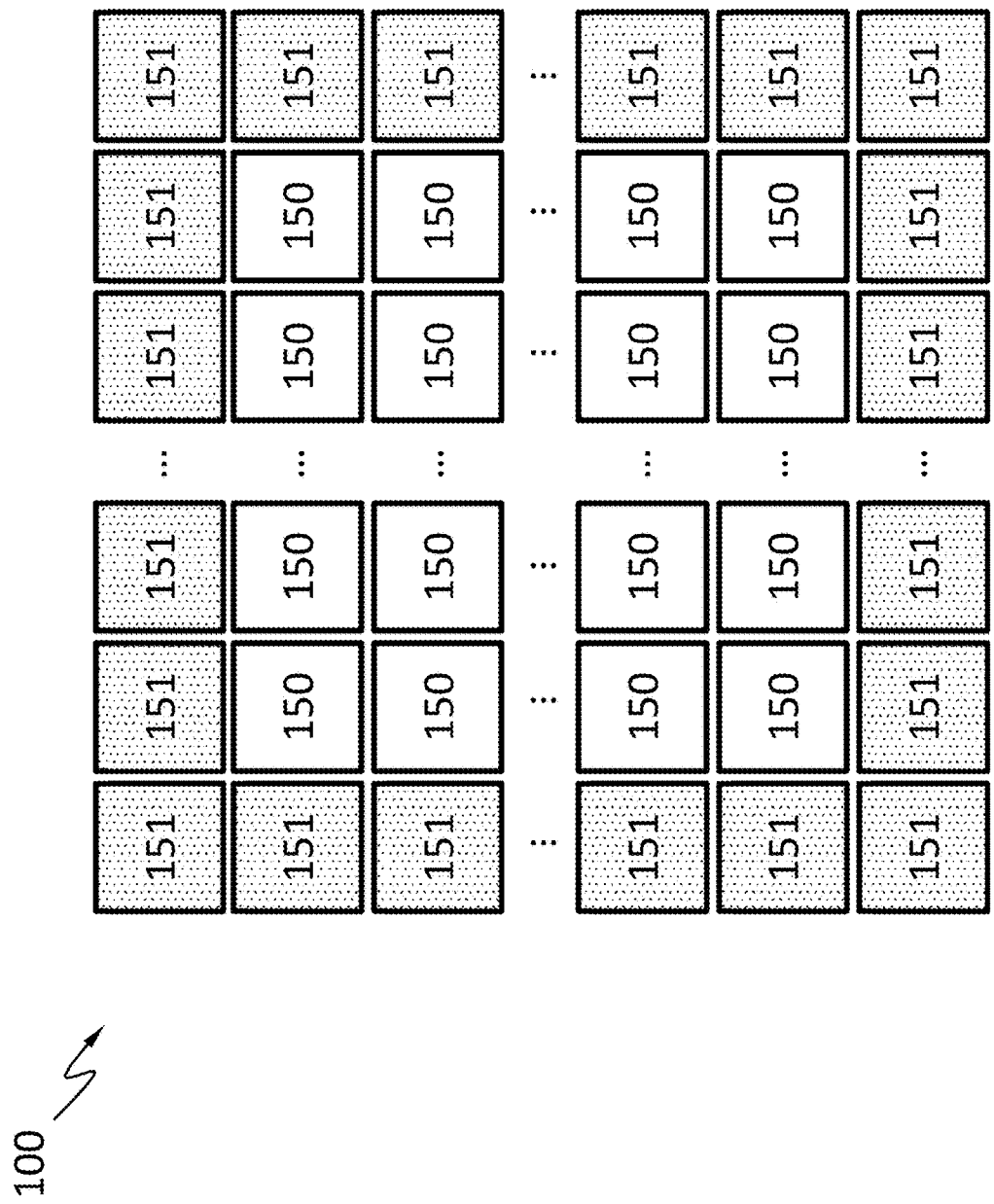
FIG. 1 schematically shows a radiation detector, according to an embodiment.

FIG. 1 schematically shows a radiation detector 100, as an example. The radiation detector 100 has an array of pixels comprising interior pixels 150 and peripheral pixels 151, wherein interior pixels 150 are encompassed by peripheral pixels 151. The peripheral pixels 151 are at a periphery of the array. The interior pixels 150 are at an interior of the array. The array may be a rectangular array, a honeycomb array, a hexagonal array or any other suitable array. Each pixel in the array (e.g., a peripheral pixel 151 or an interior pixel 150) is configured to generate an electrical signal on an electrode thereof, upon exposure to a radiation, which may be from a radiation source. Each pixel may be configured to measure a characteristic (e.g., the energy of the particles, the wavelength, and the frequency) of the radiation. For example, each pixel in the array may be configured to count numbers of radiation particles (e.g., photons) incident thereon whose energy falls in a plurality of bins, within a period of time. Each pixel in the array may be configured to count the numbers of radiation particles incident thereon within a plurality of bins of energy within the same period of time. Each pixel in the array may have its own analog-to-digital converter (ADC) configured to digitize an analog signal representing the energy of an incident radiation particle into a digital signal. Each pixel in the array may be configured to operate in parallel. For example, when one pixel measures an incident radiation particle, another pixel may be waiting for a radiation particle to arrive. The pixels in the array may not have to be individually addressable.

Figure 2A:
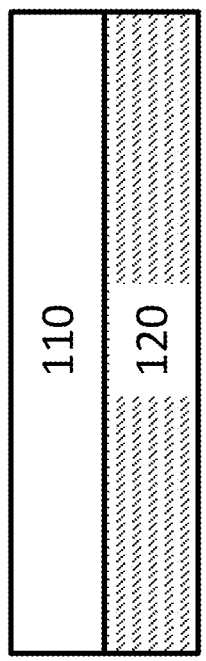
FIG. 2A schematically shows a cross-sectional view of the radiation detector.

FIG. 2A schematically shows a cross-sectional view of the radiation detector 100, according to an embodiment. The radiation detector 100 may include a radiation absorption layer 110 and an electronics layer 120 (e.g., an ASIC) for processing or analyzing electrical signals incident radiation generates in the radiation absorption layer 110. The radiation detector 100 may or may not include a scintillator. The radiation absorption layer 110 may include a semiconductor material such as, silicon, germanium, GaAs, CdTe, CdZnTe, or a combination thereof. The semiconductor may have a high mass attenuation coefficient for the radiation of interest.

Figure 2B:
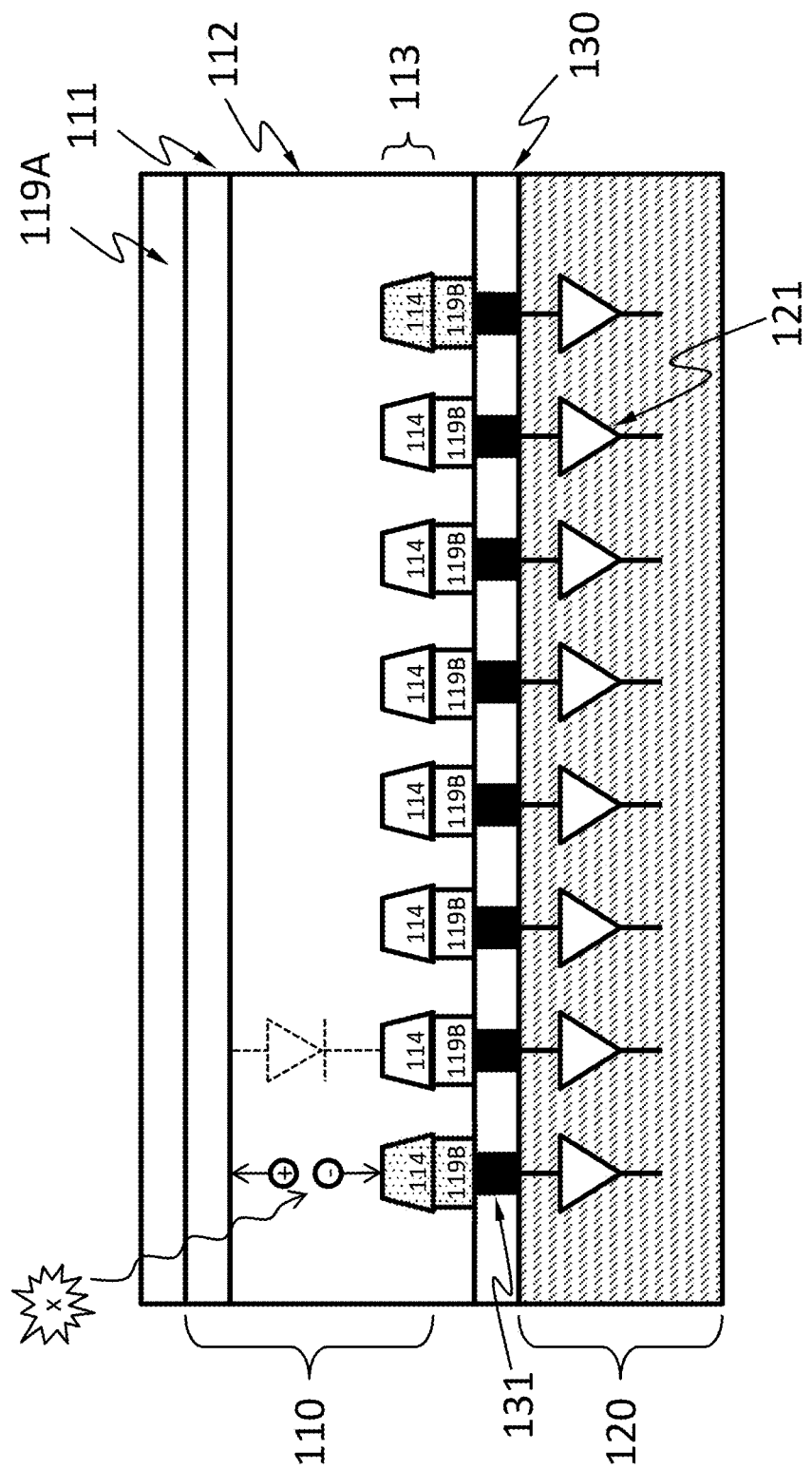
FIG. 2B schematically shows a detailed cross-sectional view of the radiation detector.

As shown in a detailed cross-sectional view of the radiation detector 100 in FIG. 2B, according to an embodiment, the radiation absorption layer 110 may include one or more diodes (e.g., p-i-n or p-n) formed by a first doped region 111, one or more discrete regions 114 of a second doped region 113. The second doped region 113 may be separated from the first doped region 111 by an optional the intrinsic region 112. The discrete regions 114 are separated from one another by the first doped region 111 or the intrinsic region 112. The first doped region 111 and the second doped region 113 have opposite types of doping (e.g., region 111 is p-type and region 113 is n-type, or region 111 is n-type and region 113 is p-type). In the example in FIG. 2B, each of the discrete regions 114 of the second doped region 113 forms a diode with the first doped region 111 and the optional intrinsic region 112. Namely, in the example in FIG. 2B, the radiation absorption layer 110 has a plurality of diodes having the first doped region 111 as a shared electrode. The first doped region 111 may also have discrete portions.

When radiation from the radiation source hits the radiation absorption layer 110 including diodes, the radiation particle may be absorbed and generate one or more charge carriers by a number of mechanisms. The charge carriers may drift to the electrodes of one of the diodes under an electric field. The field may be an external electric field. The electrical contact 119B may include discrete portions each of which is in electrical contact with the discrete regions 114. In an embodiment, the charge carriers may drift in directions such that the charge carriers generated by a single particle of the radiation are not substantially shared by two different discrete regions 114 ("not substantially shared" here means less than 2%, less than 0.5%, less than 0.1%, or less than 0.01% of these charge carriers flow to a different one of the discrete regions 114 than the rest of the charge carriers). Charge carriers generated by a particle of the radiation incident around the footprint of one of these discrete regions 114 are not substantially shared with another of these discrete regions 114. A pixel, 150 or 151, associated with a discrete region 114 may be an area around the discrete region 114 in which substantially all (more than 98%, more than 99.5%, more than 99.9%, or more than 99.99% of) charge carriers generated by a particle of the radiation incident therein flow to the discrete region 114. Namely, less than 2%, less than 1%, less than 0.1%, or less than 0.01% of these charge carriers flow beyond the pixel.

Figure 2C:
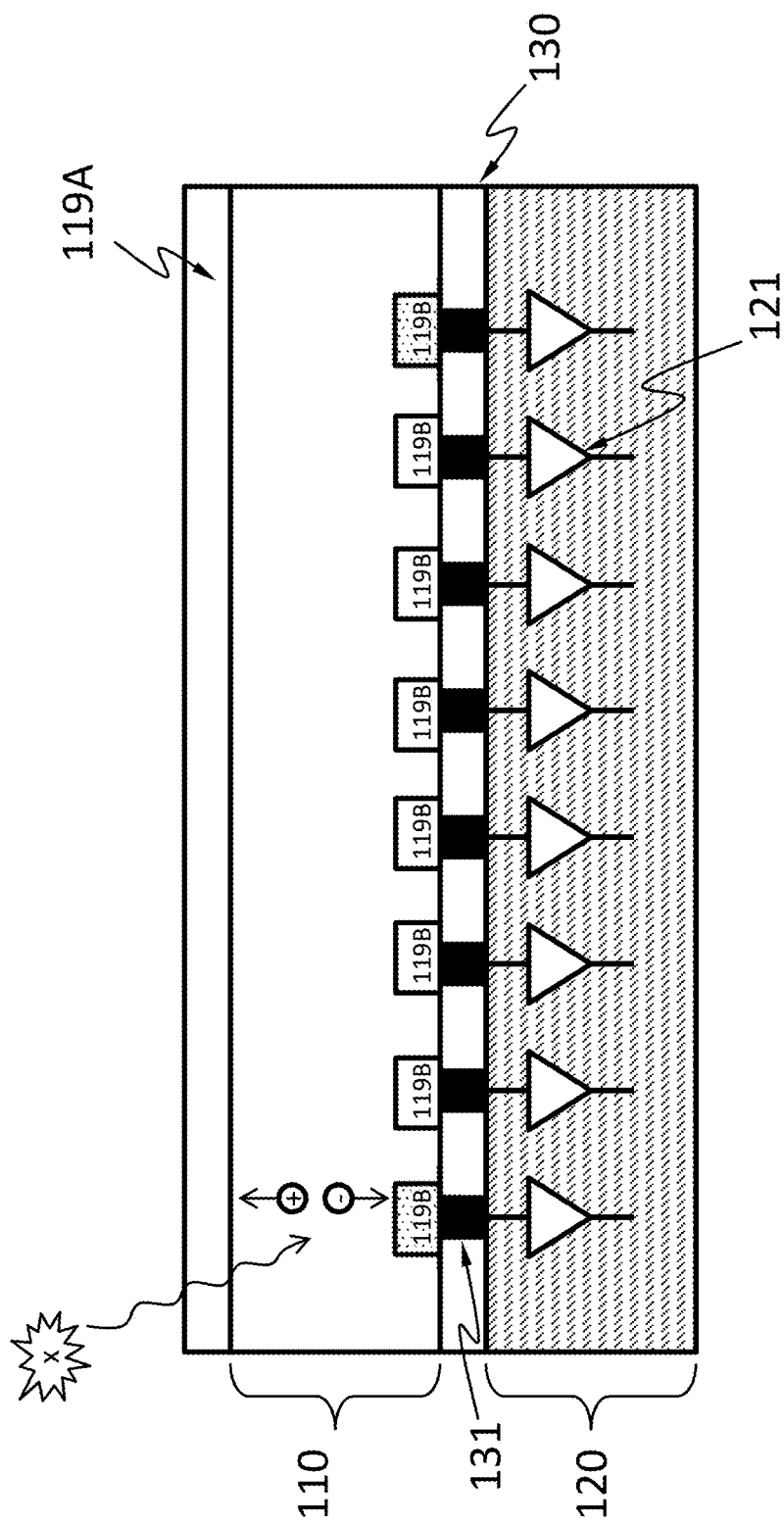
FIG. 2C schematically shows an alternative detailed cross-sectional view of the radiation detector.

As shown in an alternative detailed cross-sectional view of the radiation detector 100 in FIG. 2C, according to an embodiment, the radiation absorption layer 110 may include a resistor of a semiconductor material such as, silicon, germanium, GaAs, CdTe, CdZnTe, or a combination thereof, but does not include a diode. The semiconductor may have a high mass attenuation coefficient for the radiation of interest.

When the radiation hits the radiation absorption layer 110 including a resistor but not diodes, it may be absorbed and generate one or more charge carriers by a number of mechanisms. A particle of the radiation may generate 10 to 100000 charge carriers. The charge carriers may drift to the electrical contacts 119A and 119B under an electric field. The field may be an external electric field. The electrical contact 119B includes discrete portions. In an embodiment, the charge carriers may drift in directions such that the charge carriers generated by a single particle of the radiation are not substantially shared by two different discrete portions of the electrical contact 119B ("not substantially shared" here means less than 2%, less than 0.5%, less than 0.1%, or less than 0.01% of these charge carriers flow to a different one of the discrete portions than the rest of the charge carriers). Charge carriers generated by a particle of the radiation incident around the footprint of one of these discrete portions of the electrical contact 119B are not substantially shared with another of these discrete portions of the electrical contact 119B. A pixel (e.g., interior pixel 150 or peripheral pixel 151) associated with a discrete portion of the electrical contact 119B may be an area around the discrete portion in which substantially all (more than 98%, more than 99.5%, more than 99.9% or more than 99.99% of) charge carriers generated by a particle of the radiation incident therein flow to the discrete portion of the electrical contact 119B. Namely, less than 2%, less than 0.5%, less than 0.1%, or less than 0.01% of these charge carriers flow beyond the pixel associated with the one discrete portion of the electrical contact 119B.

The electronics layer 120 may include an electronic system 121 suitable for processing or interpreting signals generated by the radiation incident on the radiation absorption layer 110. The electronic system 121 may include an analog circuitry such as a filter network, amplifiers, integrators, and comparators, or a digital circuitry such as a microprocessor, and a memory. The electronic system 121 may include one or more ADCs. The electronic system 121 may include components shared by the pixels or components dedicated to a single pixel. For example, the electronic system 121 may include an amplifier dedicated to each pixel and a microprocessor shared among all the pixels. The electronic system 121 may be electrically connected to the pixels by vias 131. Space among the vias may be filled with a filler material 130, which may increase the mechanical stability of the connection of the electronics layer 120 to the radiation absorption layer 110. Other bonding techniques are possible to connect the electronic system 121 to the pixels without using vias.

The signals generated by the radiation incident on the radiation absorption layer 110 may be in a form of an electric current. Likewise, the dark noise may also be in a form of an electric current (e.g., a DC current flowing from the electric contacts 119B). If the current may be ascertained, the electric current may be compensated for (e.g., diverted from) the electronic system 121.

Figure 3A:
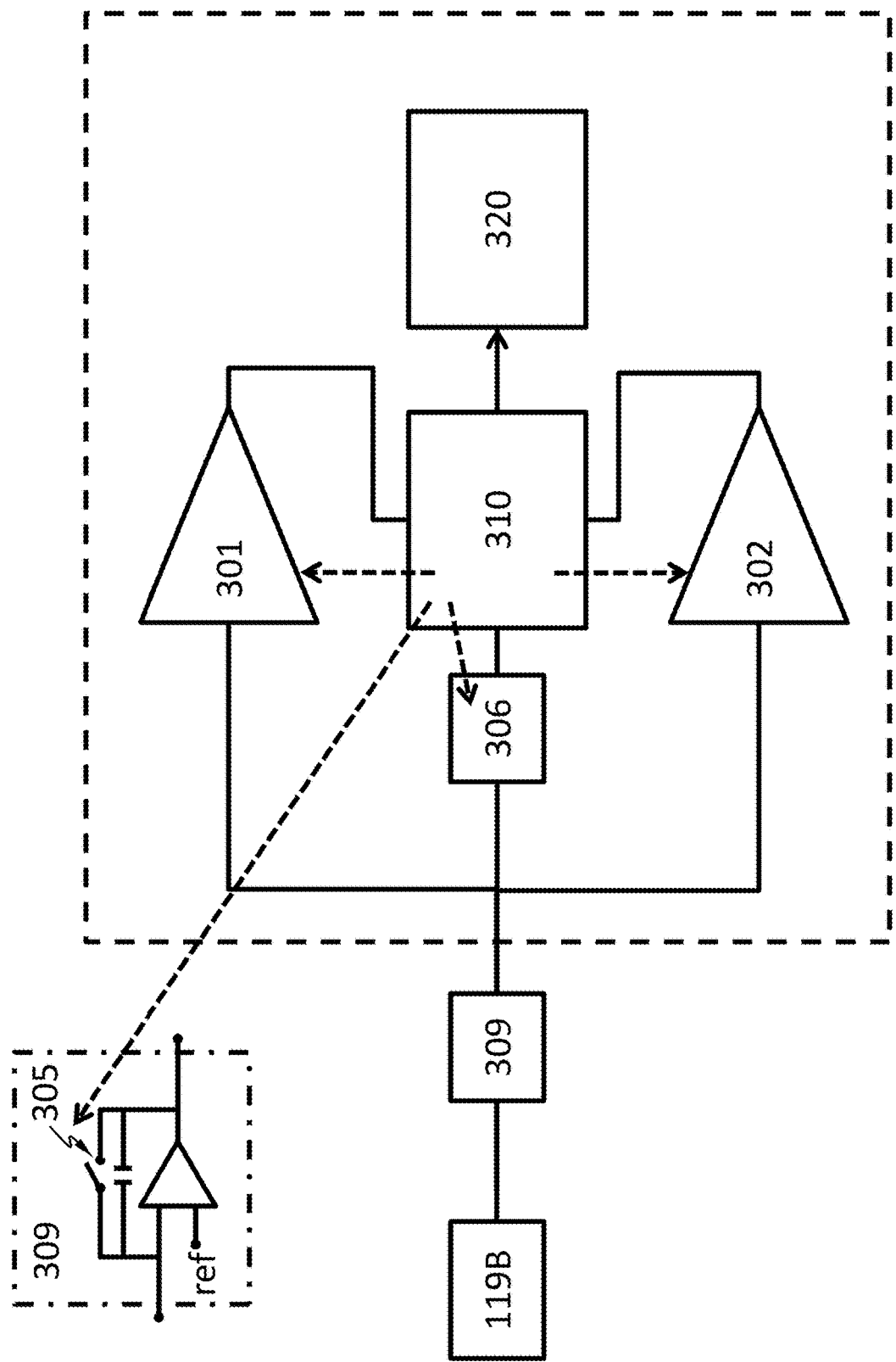
FIG. 3A and FIG. 3B each show a component diagram of an electronic system of the detector in FIG. 2B of FIG. 2C, according to an embodiment.
Figure 3B:
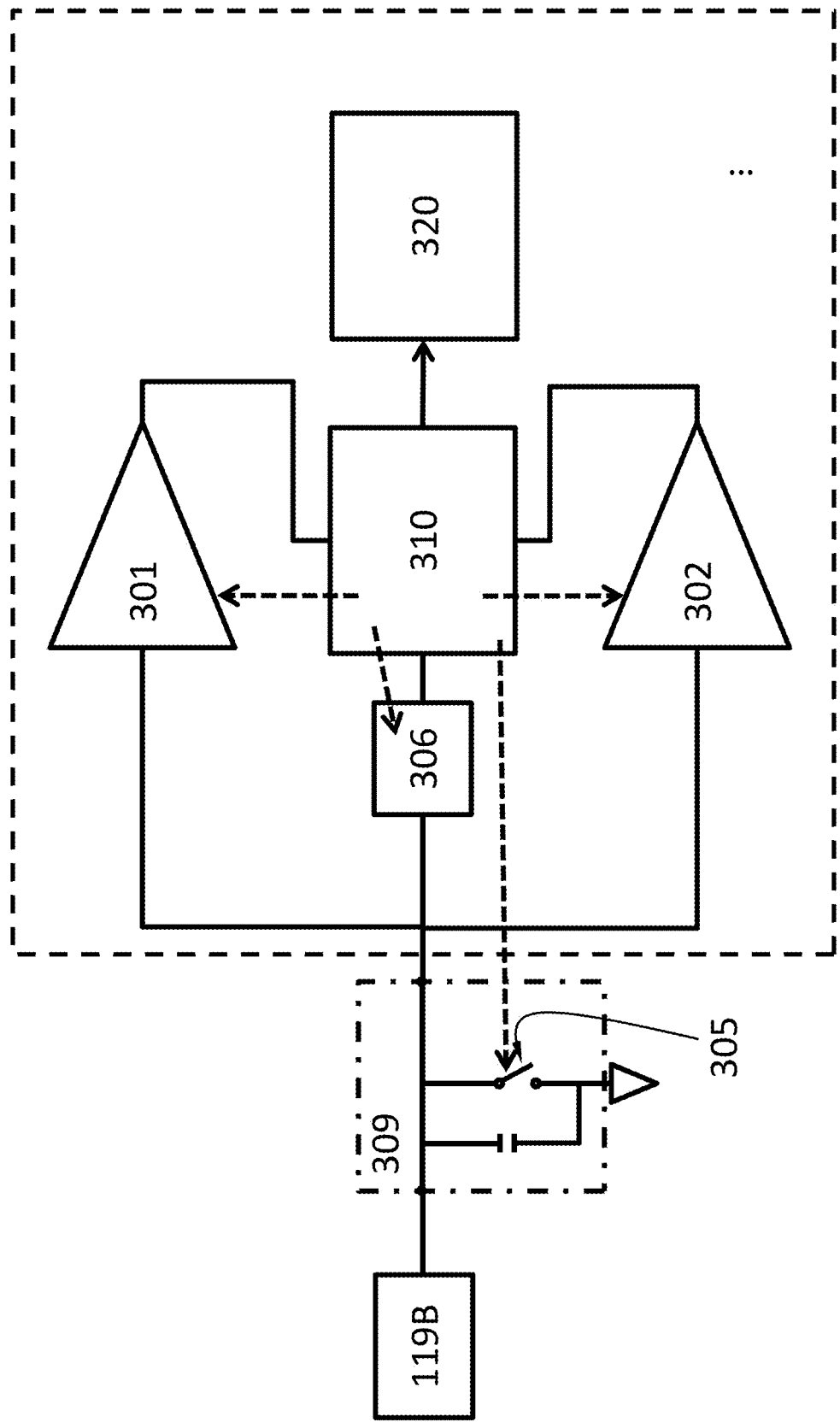

FIG. 3A and FIG. 3B each show a component diagram of the electronic system 121, according to an embodiment. The system 121 includes a capacitor module 309 electrically connected to an electrode of a diode 300 or an electrical contact, wherein the capacitor module is configured to collect charge carriers from the electrode. The capacitor module 309 can include a capacitor and charge carriers from the electrode accumulate on the capacitor over a period of time ("integration period"). After the integration period has expired, the capacitor voltage is sampled and then reset by a reset switch. The capacitor module can include a capacitor directly connected to the electrode. The capacitor may be in the feedback path of an amplifier. The amplifier configured as such is called a capacitive transimpedance amplifier (CTIA). CTIA has high dynamic range by keeping the amplifier from saturating and improves the signal-to-noise ratio by limiting the bandwidth in the signal path.

The dark noise in the form of an electric current, if not compensated for, charges the capacitor in the capacitor module 309 along with the signals generated by the radiation. A part of the dark noise may be attributed to crystallographic defects within the semiconductor material. The nature or density of the crystallographic defects may be different in peripheral pixels and in interior pixels. Because the peripheral pixels may have sidewalls with discontinuities in the lattice, the effect of the dark noise on a peripheral pixel 151 may be greater than the effect of the dark noise on an interior pixel 150 (e.g., 10 times larger, 100 times larger, 1000 times larger). For example, the electric current of the dark noise of the interior pixel 150 may be in the range of picoamps (i.e., 1-1000 pA); the electric current of the dark noise of the peripheral pixel 151 may be in the range of nanoamps (i.e., 1-1000 nA).

Figure 4A:
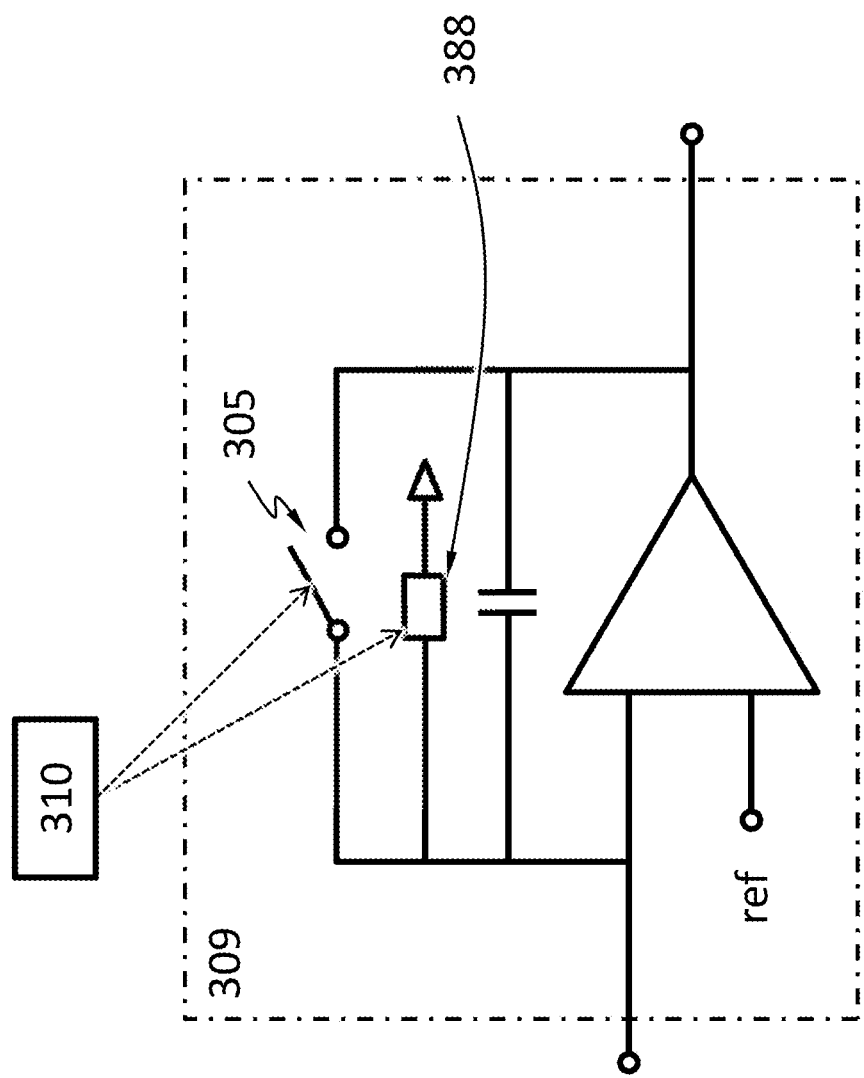
FIG. 4A and FIG. 4B respectively show a circuit configured to compensate for the dark noise in the form of an electric current.
Figure 4B:
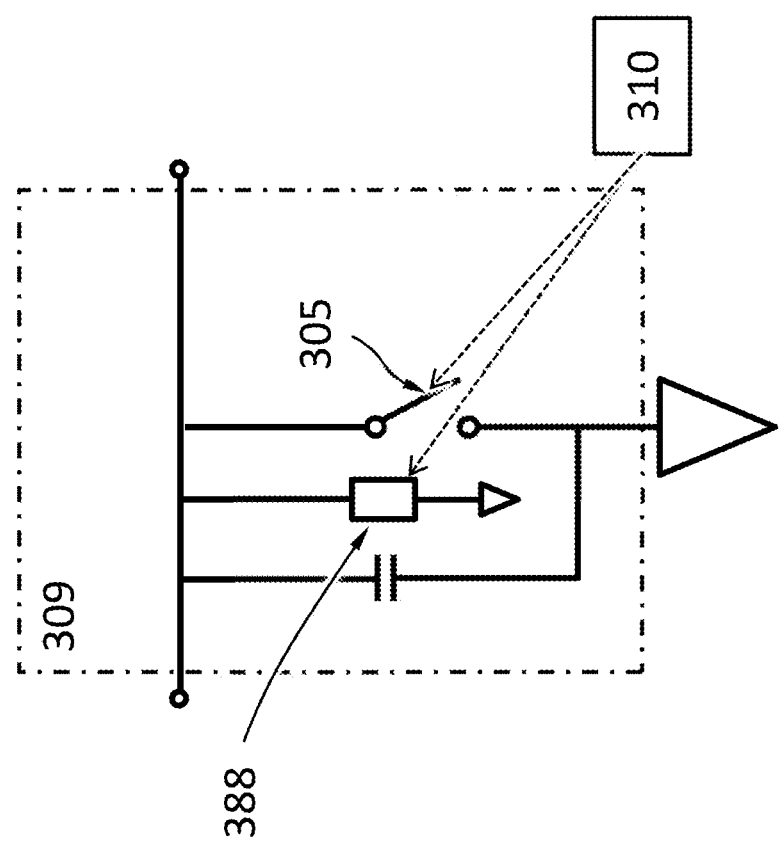

FIG. 4A and FIG. 4B respectively show a circuit configured to compensate for the dark noise in the form of an electric current. A current sourcing module 388 is in parallel to the capacitor of the capacitor module 309. The current sourcing module 388 may be adjustable such that the electric current it sources compensates for the electric current of the dark noise of a pixel of the radiation detector 100. Because the dark noise of the peripheral pixels 151 may be different from (e.g., larger than) the dark noise of the interior pixels 150, the current sourcing module 388 may be configured to provide a first compensatory signal (e.g., a first compensatory electric current) to the peripheral pixels 151, and to provide a second compensatory signal (e.g., a second compensatory electric current) to the interior pixels 150. The magnitude of the first compensatory signal may be 10 times, or 100 times, or 1000 times larger than the second compensatory signal. The first compensatory signal may be different than the second compensatory signal, in waveforms or in frequencies. In the circuit shown in FIG. 4A and FIG. 4B, the electric current of the dark noise is diverted through the current sourcing module 388 so that the electric current of the dark noise does not charge the capacitor.

The electronic system 121 may include a first voltage comparator 301, a second voltage comparator 302, a counter 320, a switch 305, a voltmeter 306 and a controller 310, as shown in FIG. 3A and FIG. 3B.

The first voltage comparator 301 is configured to compare the voltage of an electrode of a diode 300 to a first threshold. The diode may be a diode formed by the first doped region 111, one of the discrete regions 114 of the second doped region 113, and the optional intrinsic region 112. Alternatively, the first voltage comparator 301 is configured to compare the voltage of an electrical contact (e.g., a discrete portion of electrical contact 119B) to a first threshold. The first voltage comparator 301 may be configured to monitor the voltage directly, or calculate the voltage by integrating an electric current flowing through the diode or electrical contact over a period of time. The first voltage comparator 301 may be controllably activated or deactivated by the controller 310. The first voltage comparator 301 may be a continuous comparator. Namely, the first voltage comparator 301 may be configured to be activated continuously, and monitor the voltage continuously. The first voltage comparator 301 configured as a continuous comparator reduces the chance that the system 121 misses signals generated by an incident radiation particle. The first voltage comparator 301 configured as a continuous comparator is especially suitable when the incident radiation intensity is relatively high. The first voltage comparator 301 may be a clocked comparator, which has the benefit of lower power consumption. The first voltage comparator 301 configured as a clocked comparator may cause the system 121 to miss signals generated by some incident radiation particles. When the incident radiation intensity is low, the chance of missing an incident radiation particle is low because the time interval between two successive photons is relatively long. Therefore, the first voltage comparator 301 configured as a clocked comparator is especially suitable when the incident radiation intensity is relatively low. The first threshold may be 5-10%, 10%-20%, 20-30%, 30-40% or 40-50% of the maximum voltage one incident radiation particle may generate in the diode or the resistor. The maximum voltage may depend on the energy of the incident radiation particle (i.e., the wavelength of the incident radiation), the material of the radiation absorption layer 110, and other factors. For example, the first threshold may be 50 mV, 100 mV, 150 mV, or 200 mV.

The second voltage comparator 302 is configured to compare the voltage to a second threshold. The second voltage comparator 302 may be configured to monitor the voltage directly, or calculate the voltage by integrating an electric current flowing through the diode or the electrical contact over a period of time. The second voltage comparator 302 may be a continuous comparator. The second voltage comparator 302 may be controllably activate or deactivated by the controller 310. When the second voltage comparator 302 is deactivated, the power consumption of the second voltage comparator 302 may be less than 1%, less than 5%, less than 10% or less than 20% of the power consumption when the second voltage comparator 302 is activated. The absolute value of the second threshold is greater than the absolute value of the first threshold. As used herein, the term "absolute value" or "modulus" |x| of a real number x is the non-negative value of x without regard to its sign. Namely, $$|x| = \begin{cases} x, & \text{if } x \geq 0 \\ -x, & \text{if } x \leq 0 \end{cases}.$$

The second threshold may be 200%-300% of the first threshold. The second threshold may be at least 50% of the maximum voltage one incident radiation particle may generate in the diode or resistor. For example, the second threshold may be 100 mV, 150 mV, 200 mV, 250 mV or 300 mV. The second voltage comparator 302 and the first voltage comparator 301 may be the same component. Namely, the system 121 may have one voltage comparator that can compare a voltage with two different thresholds at different times.

The first voltage comparator 301 or the second voltage comparator 302 may include one or more op-amps or any other suitable circuitry. The first voltage comparator 301 or the second voltage comparator 302 may have a high speed to allow the system 121 to operate under a high flux of incident radiation. However, having a high speed is often at the cost of power consumption.

The counter 320 is configured to register a number of radiation particles reaching the diode or resistor. The counter 320 may be a software component (e.g., a number stored in a computer memory) or a hardware component (e.g., a 4017 IC and a 7490 IC).

The controller 310 may be a hardware component such as a microcontroller and a microprocessor. The controller 310 is configured to start a time delay from a time at which the first voltage comparator 301 determines that the absolute value of the voltage equals or exceeds the absolute value of the first threshold (e.g., the absolute value of the voltage increases from below the absolute value of the first threshold to a value equal to or above the absolute value of the first threshold). The absolute value is used here because the voltage may be negative or positive, depending on whether the voltage of the cathode or the anode of the diode or which electrical contact is used. The controller 310 may be configured to keep deactivated the second voltage comparator 302, the counter 320 and any other circuits the operation of the first voltage comparator 301 does not require, before the time at which the first voltage comparator 301 determines that the absolute value of the voltage equals or exceeds the absolute value of the first threshold. The time delay may expire before or after the voltage becomes stable, i.e., the rate of change of the voltage is substantially zero. The phase "the rate of change of the voltage is substantially zero" means that temporal change of the voltage is less than 0.1%/ns. The phase "the rate of change of the voltage is substantially non-zero" means that temporal change of the voltage is at least 0.1%/ns.

The controller 310 may be configured to activate the second voltage comparator during (including the beginning and the expiration) the time delay. In an embodiment, the controller 310 is configured to activate the second voltage comparator at the beginning of the time delay. The term "activate" means causing the component to enter an operational state (e.g., by sending a signal such as a voltage pulse or a logic level, by providing power, etc.). The term "deactivate" means causing the component to enter a non-operational state (e.g., by sending a signal such as a voltage pulse or a logic level, by cut off power, etc.). The operational state may have higher power consumption (e.g., 10 times higher, 100 times higher, 1000 times higher) than the non-operational state. The controller 310 itself may be deactivated until the output of the first voltage comparator 301 activates the controller 310 when the absolute value of the voltage equals or exceeds the absolute value of the first threshold.

The controller 310 may be configured to cause the number registered by the counter 320 to increase by one, if, during the time delay, the second voltage comparator 302 determines that the absolute value of the voltage equals or exceeds the absolute value of the second threshold.

The controller 310 may be configured to cause the voltmeter 306 to measure the voltage upon expiration of the time delay. The controller 310 may be configured to connect the electrode to an electrical ground, so as to reset the voltage and discharge any charge carriers accumulated on the electrode. In an embodiment, the electrode is connected to an electrical ground after the expiration of the time delay. In an embodiment, the electrode is connected to an electrical ground for a finite reset time period. The controller 310 may connect the electrode to the electrical ground by controlling the switch 305. The switch may be a transistor such as a field-effect transistor (FET).

The controller 310 may be configured to control the current sourcing module 388. For example, the controller 310 may change the magnitude, or the waveform, or the frequency of compensatory electric current for the dark noise by controlling the current sourcing module 388. The controller 310 may execute instructions and thereby implement the flows of FIG. 7 and FIG. 8.

Figure 5:
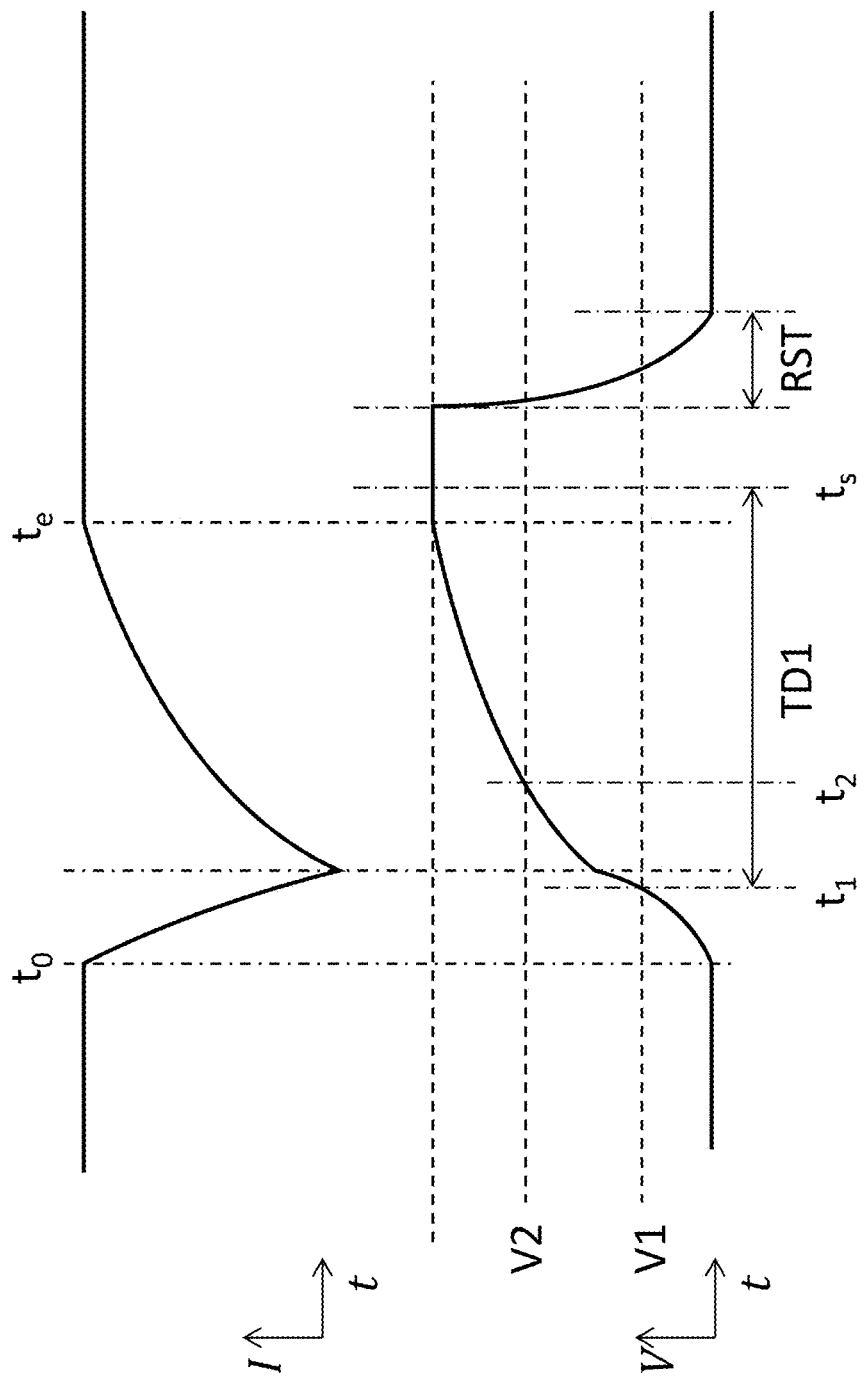
FIG. 5 schematically shows a temporal change of the electric current flowing through an electrode (upper curve) of a diode or an electrical contact of a resistor of a radiation absorption layer exposed to radiation, the electric current caused by charge carriers generated by a radiation particle incident on the radiation absorption layer, and a corresponding temporal change of the voltage of the electrode (lower curve), according to an embodiment.

FIG. 5 schematically shows a temporal change of the electric current flowing through the electrode (upper curve) caused by charge carriers generated by a radiation particle incident on the diode or the resistor, and a corresponding temporal change of the voltage of the electrode (lower curve). The voltage may be an integral of the electric current with respect to time. At time $t_0$, the radiation particle hits the diode or the resistor, charge carriers start being generated in the diode or the resistor, electric current starts to flow through the electrode of the diode or the resistor, and the absolute value of the voltage of the electrode or electrical contact starts to increase. At time $t_1$, the first voltage comparator 301 determines that the absolute value of the voltage equals or exceeds the absolute value of the $t_1$ threshold V1, and the controller 310 starts the time delay TD1 and the controller 310 may deactivate the first voltage comparator 301 at the beginning of TD1. If the controller 310 is deactivated before $t_1$, the controller 310 is activated at $t_1$. During TD1, the controller 310 activates the second voltage comparator 302. The term "during" a time delay as used here means the beginning and the expiration (i.e., the end) and any time in between. For example, the controller 310 may activate the second voltage comparator 302 at the expiration of TD1. If during TD1, the second voltage comparator 302 determines that the absolute value of the voltage equals or exceeds the absolute value of the $t_2$ threshold V2 at time $t_2$, the controller 310 causes the number registered by the counter 320 to increase by one. At time $t_e$, all charge carriers generated by the radiation particle drift out of the radiation absorption layer 110. At time $t_s$, the time delay TD1 expires. In the example of FIG. 5, time $t_s$ is after time $t_e$; namely TD1 expires after all charge carriers generated by the radiation particle drift out of the radiation absorption layer 110. The rate of change of the voltage is thus substantially zero at $t_s$. The controller 310 may be configured to deactivate the second voltage comparator 302 at expiration of TD1 or at $t_2$, or any time in between.

The controller 310 may be configured to cause the voltmeter 306 to measure the voltage upon expiration of the time delay TD1. In an embodiment, the controller 310 causes the voltmeter 306 to measure the voltage after the rate of change of the voltage becomes substantially zero after the expiration of the time delay TD1. The voltage at this moment is proportional to the amount of charge carriers generated by a radiation particle, which relates to the energy of the radiation particle. The controller 310 may be configured to determine the energy of the radiation particle based on voltage the voltmeter 306 measures. One way to determine the energy is by binning the voltage. The counter 320 may have a sub-counter for each bin. When the controller 310 determines that the energy of the radiation particle falls in a bin, the controller 310 may cause the number registered in the sub-counter for that bin to increase by one. Therefore, the system 121 may be able to detect a radiation image and may be able to resolve radiation particle energy of each radiation particle.

Figure 6:
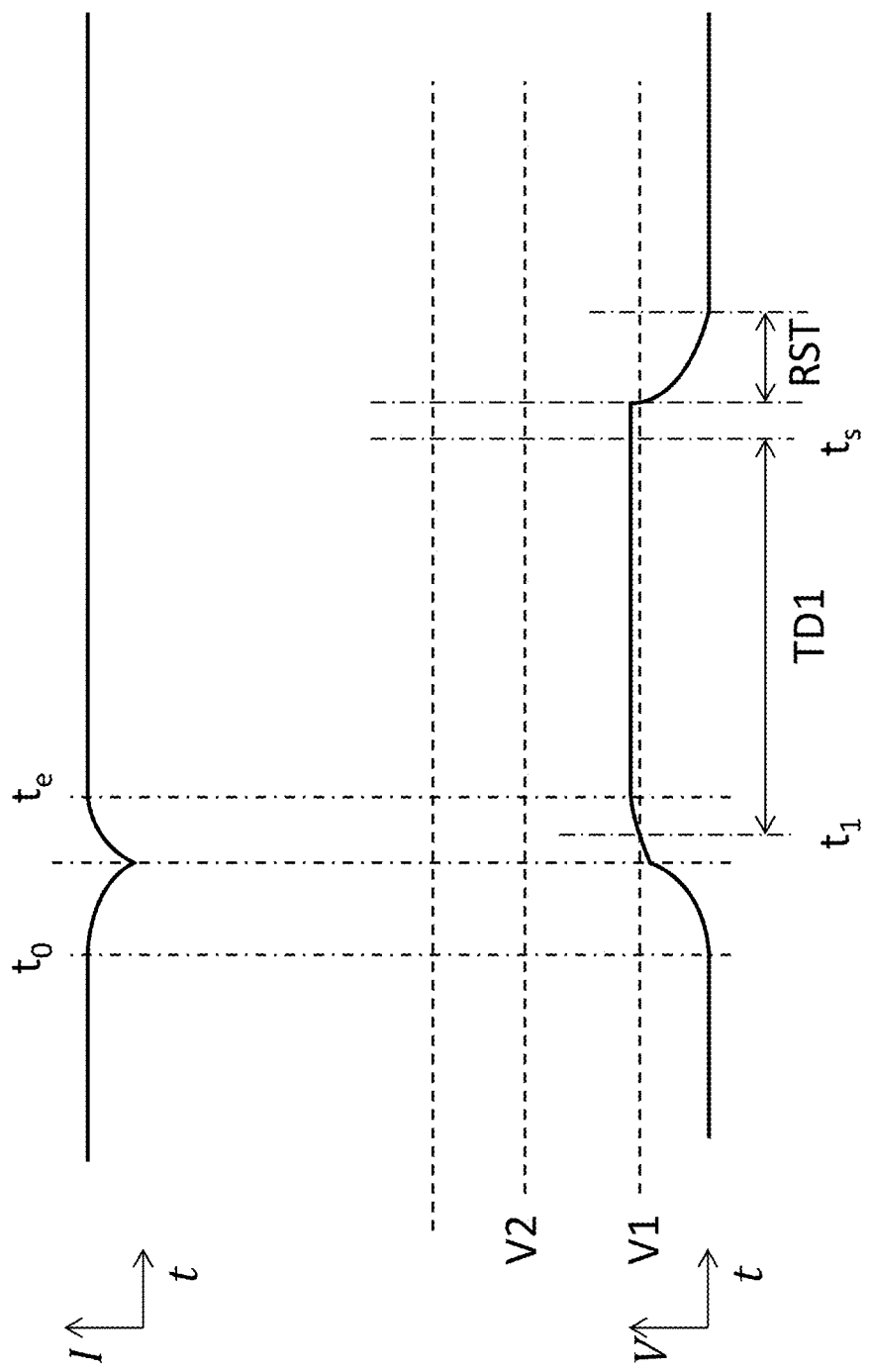
FIG. 6 schematically shows a temporal change of the electric current flowing through the electrode (upper curve) caused by noise (e.g., dark noise), and a corresponding temporal change of the voltage of the electrode (lower curve), in the electronic system operating in the way shown in FIG. 5, according to an embodiment.

FIG. 6 schematically shows a temporal change of the electric current flowing through the electrode (upper curve) caused by a dark noise, and a corresponding temporal change of the voltage of the electrode (lower curve), in the system 121 operating in the way shown in FIG. 5. At time $t_0$, the dark noise begins. If the dark noise is not large enough to cause the absolute value of the voltage to exceed the absolute value of V1, the controller 310 does not activate the second voltage comparator 302. If the noise is large enough to cause the absolute value of the voltage to exceed the absolute value of V1 at time $t_1$ as determined by the first voltage comparator 301, the controller 310 starts the time delay TD1 and the controller 310 may deactivate the first voltage comparator 301 at the beginning of TD1. During TD1 (e.g., at expiration of TD1), the controller 310 activates the second voltage comparator 302.

The dark noise of the interior pixels 150 is very unlikely large enough to cause the absolute value of the voltage to exceed the absolute value of V2 during TD1. Therefore, the controller 310 does not cause the number registered by the counter 320 to increase. At time $t_e$, the noise ends. At time $t_s$, the time delay TD1 expires. The controller 310 may be configured to deactivate the second voltage comparator 302 at expiration of TD1. The controller 310 may be configured not to cause the voltmeter 306 to measure the voltage if the absolute value of the voltage does not exceed the absolute value of V2 during TD1. After TD1 expires, the controller 310 connects the electrode to an electric ground for a reset period RST to allow charge carriers accumulated on the electrode as a result of the noise to flow to the ground and reset the voltage.

The dark noise of the peripheral pixels 151 of the radiation detector may be much larger than the dark noise of the interior pixels 150 in magnitude (e.g., 10 times larger, 100 times larger, or 1000 times larger). The absolute value of V2 may be larger for the peripheral pixels 151 than for the interior pixels 150. The absolute value of V2 for the peripheral pixels 151 may be empirically chosen to be sufficiently high such that the absolute value of the voltage caused by the dark noise of the peripheral pixels 151 does not exceed the absolute value of V2 during TD1, thereby preventing the number registered by the counter 320 from increasing as a result of the dark noise. The absolute value of V2 for the peripheral pixels 151 may be empirically chosen such that the absolute value of the voltage caused by an incident radiation particle exceeds the absolute value of V2 during TD1. At time $t_e$, the noise ends. At time $t_s$, the time delay TD1 expires. The controller 310 may be configured to deactivate the second voltage comparator 302 at expiration of TD1. The controller 310 may be configured not to cause the voltmeter 306 to measure the voltage if the absolute value of the voltage does not exceed the absolute value of V2 during TD1. After TD1 expires, the controller 310 connects the electrode to an electric ground for a reset period RST to allow charge carriers accumulated on the electrode as a result of the noise to flow to the ground and reset the voltage. Therefore, the system 121 may be very effective in noise rejection.

Figure 7:
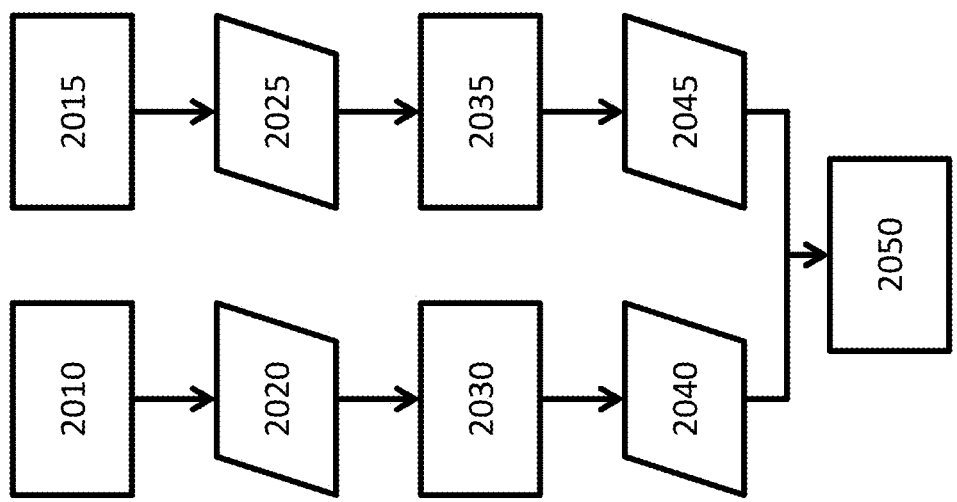
FIG. 7 schematically shows a flow chart for a method of compensating for dark noise in a radiation detector.

FIG. 7 schematically shows a flow chart for a method of using the radiation detector 100. In procedure 2010, a contribution 2020 of a first dark noise in the electrical signals of the peripheral pixels 151 is determined, for example, by measuring the signals while the radiation detector 100 receives no radiation. In procedure 2030, a first compensatory signal 2040 is determined based on the contribution 2020 of the first dark noise. In procedure 2015, a contribution 2025 of a second dark noise in the electrical signals of the interior pixels 150 is determined, for example, by measuring the electrical signals of the interior pixels 150 while the radiation detector 100 receives no radiation. In procedure 2035, a second compensatory signal 2045 is determined based on the contribution 2025 of the second dark noise. The first compensatory signal 2040 may be an electric current or the second compensatory signal 2045 may be an electric current, where the electric current may be output by the current sourcing module 388, and may be different in magnitudes, or in waveforms, or in frequencies. In procedure 2050, the electrical signals of the peripheral pixels 151 of the radiation detector 100 are compensated for the first dark noise with the first compensatory signal 2040 and the electrical signals of the interior pixels 150 are compensated for the second dark noise with the second compensatory signal 2045, respectively.

The system 121 has no analog filter network (e.g., a RC network). In an embodiment, the system 121 has no analog circuitry.

In an embodiment, the voltmeter 306 may feed the voltage it measures to the controller 310 as an analog or digital signal.

According to an embodiment, the radiation detector may be used for X-ray detection applications.

Figure 8:
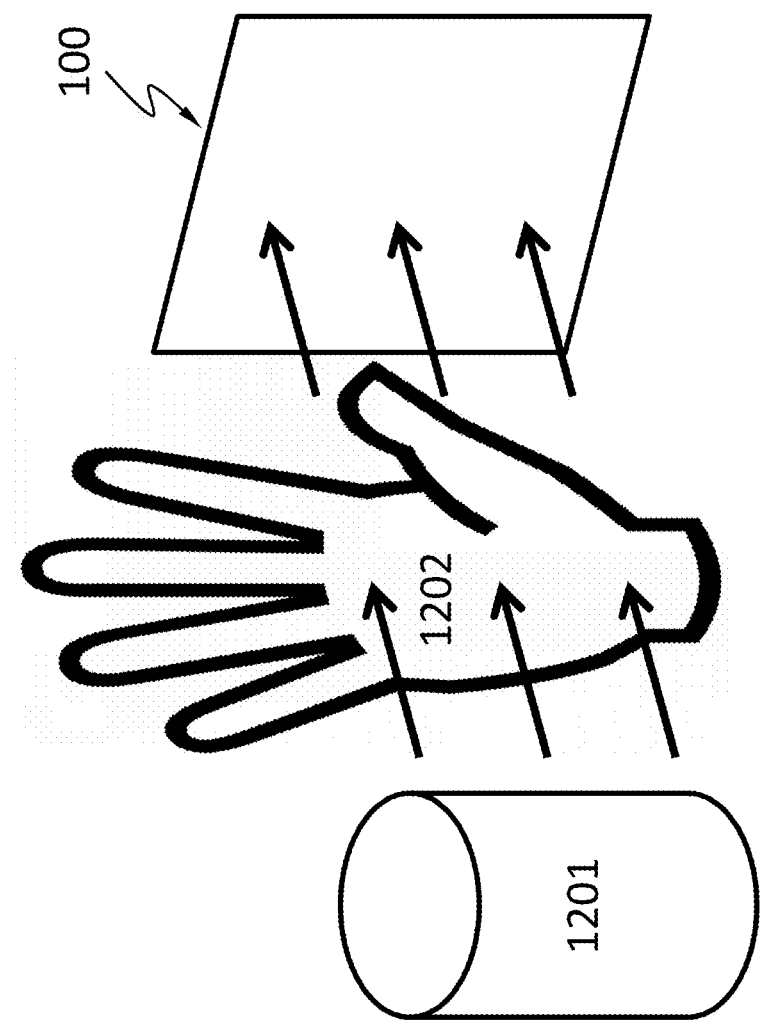
FIG. 8-FIG. 14 each schematically show a system comprising the radiation detector described herein.

FIG. 8 schematically shows a system comprising the radiation detector 100 described herein. The system may be used for medical imaging such as chest X-ray radiography, abdominal X-ray radiography, etc. The system comprises a pulsed radiation source 1201 that emits X-ray. X-ray emitted from the pulsed radiation source 1201 penetrates an object 1202 (e.g., a human body part such as chest, limb, abdomen), is attenuated by different degrees by the internal structures of the object 1202 (e.g., bones, muscle, fat and organs, etc.), and is projected to the radiation detector 100. The radiation detector 100 forms an image by detecting the intensity distribution of the X-ray.

Figure 9:
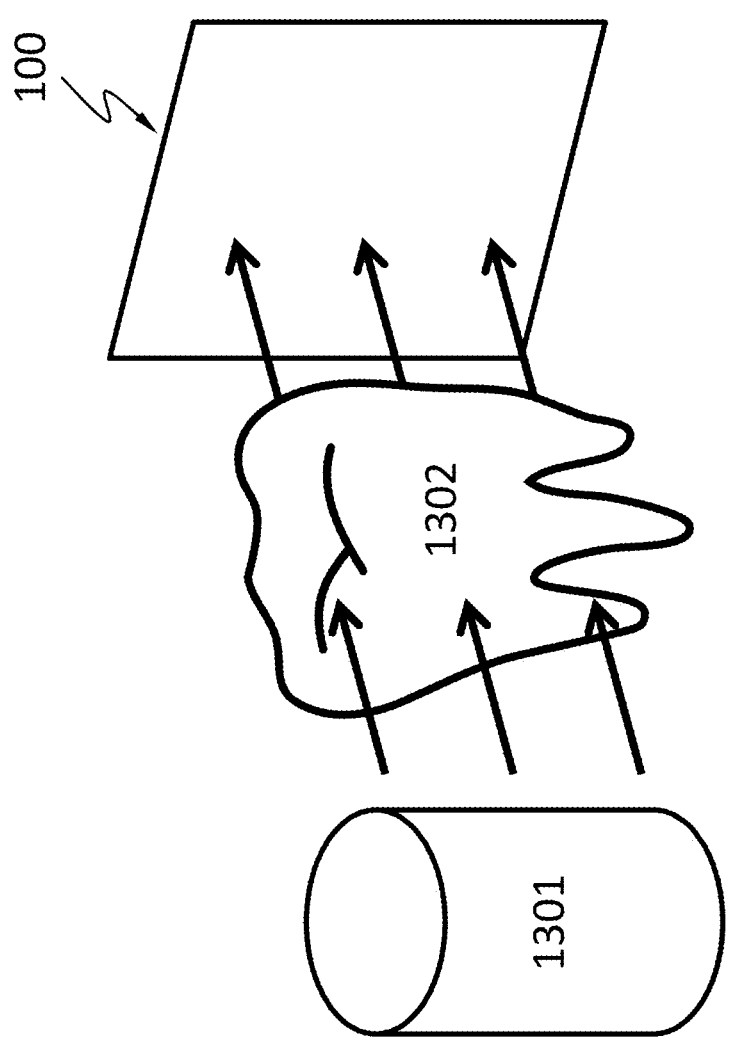

FIG. 9 schematically shows a system comprising the radiation detector 100 described herein. The system may be used for medical imaging such as dental X-ray radiography. The system comprises a pulsed radiation source 1301 that emits X-ray. X-ray emitted from the pulsed radiation source 1301 penetrates an object 1302 that is part of a mammal (e.g., human) mouth. The object 1302 may include a maxilla bone, a palate bone, a tooth, the mandible, or the tongue. The X-ray is attenuated by different degrees by the different structures of the object 1302 and is projected to the radiation detector 100. The radiation detector 100 forms an image by detecting the intensity distribution of the X-ray. Teeth absorb X-ray more than dental caries, infections, periodontal ligament. The dosage of X-ray radiation received by a dental patient is typically small (around 0.150 mSv for a full mouth series).

Figure 10:
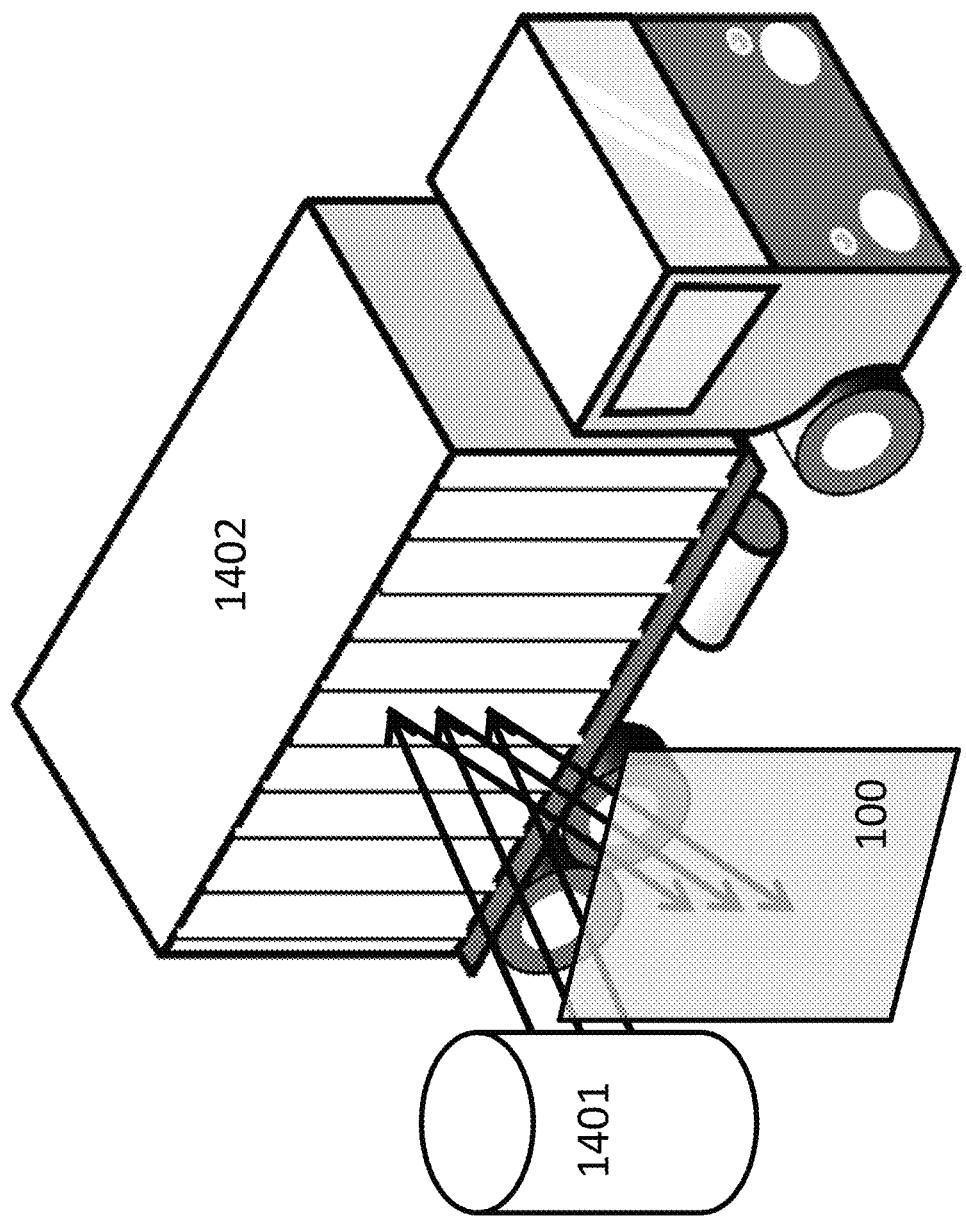

FIG. 10 schematically shows a cargo scanning or non-intrusive inspection (NII) system comprising the radiation detector 100 described herein. The system may be used for inspecting and identifying goods in transportation systems such as shipping containers, vehicles, ships, luggage, etc. The system comprises a pulsed radiation source 1401. Radiation emitted from the pulsed radiation source 1401 may backscatter from an object 1402 (e.g., shipping containers, vehicles, ships, etc.) and be projected to the radiation detector 100. Different internal structures of the object 1402 may backscatter the radiation differently. The radiation detector 100 forms an image by detecting the intensity distribution of the backscattered radiation and/or energies of the backscattered radiation.

Figure 11:
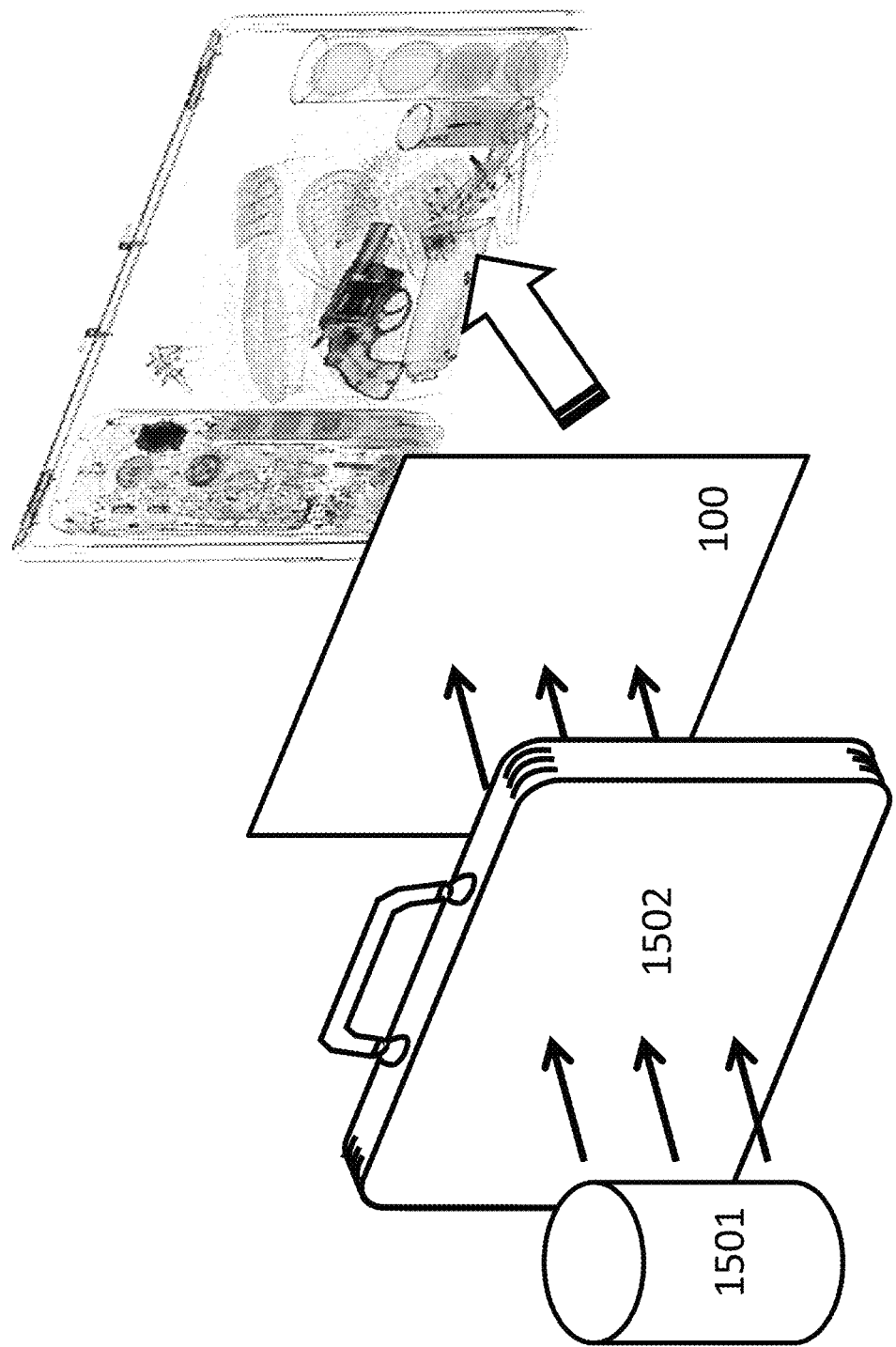

FIG. 11 schematically shows another cargo scanning or non-intrusive inspection (NII) system comprising the radiation detector 100 described herein. The system may be used for luggage screening at public transportation stations and airports. The system comprises a pulsed radiation source 1501 that emits X-ray. X-ray emitted from the pulsed radiation source 1501 may penetrate a piece of luggage 1502, be differently attenuated by the contents of the luggage, and projected to the radiation detector 100. The radiation detector 100 forms an image by detecting the intensity distribution of the transmitted X-ray. The system may reveal contents of luggage and identify items forbidden on public transportation, such as firearms, narcotics, edged weapons, flammables.

Figure 12:
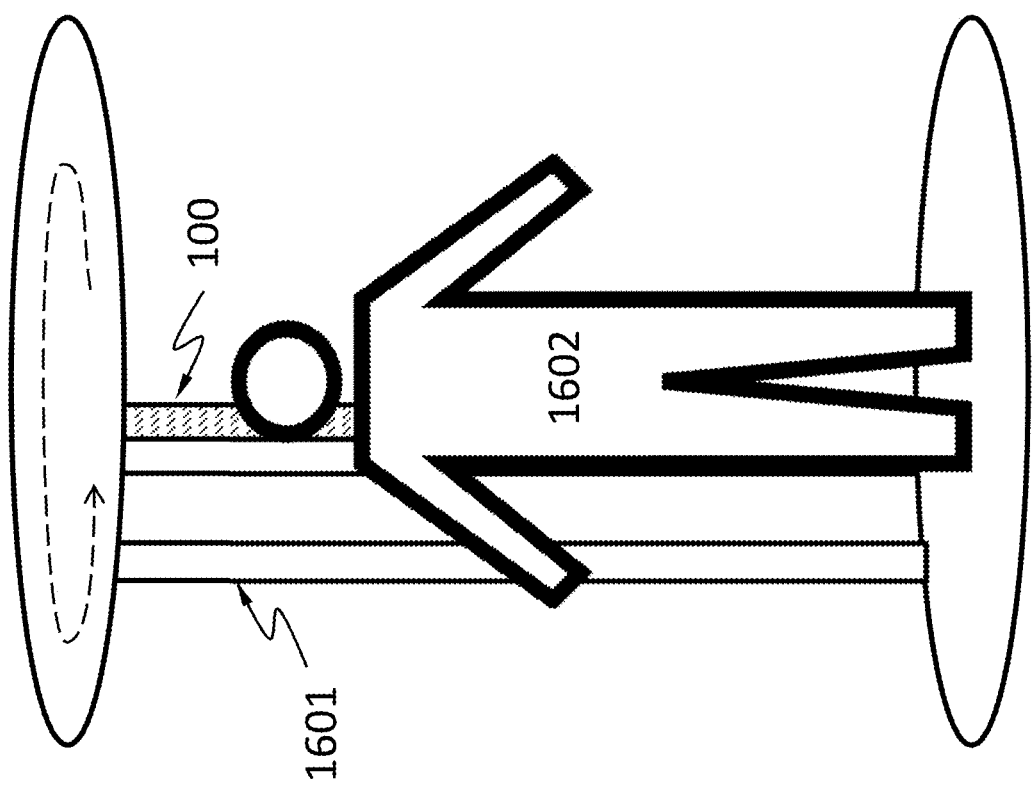

FIG. 12 schematically shows a full-body scanner system comprising the radiation detector 100 described herein. The full-body scanner system may detect objects on a person's body for security screening purposes, without physically removing clothes or making physical contact. The full-body scanner system may be able to detect non-metal objects. The full-body scanner system comprises a pulsed radiation source 1601. The radiation emitted from the pulsed radiation source 1601 may backscatter from a human 1602 being screened and objects thereon, and be projected to the radiation detector 100. The objects and the human body may backscatter the radiation differently. The radiation detector 100 forms an image by detecting the intensity distribution of the backscattered radiation. The radiation detector 100 and the pulsed radiation source 1601 may be configured to scan the human in a linear or rotational direction.

Figure 13:
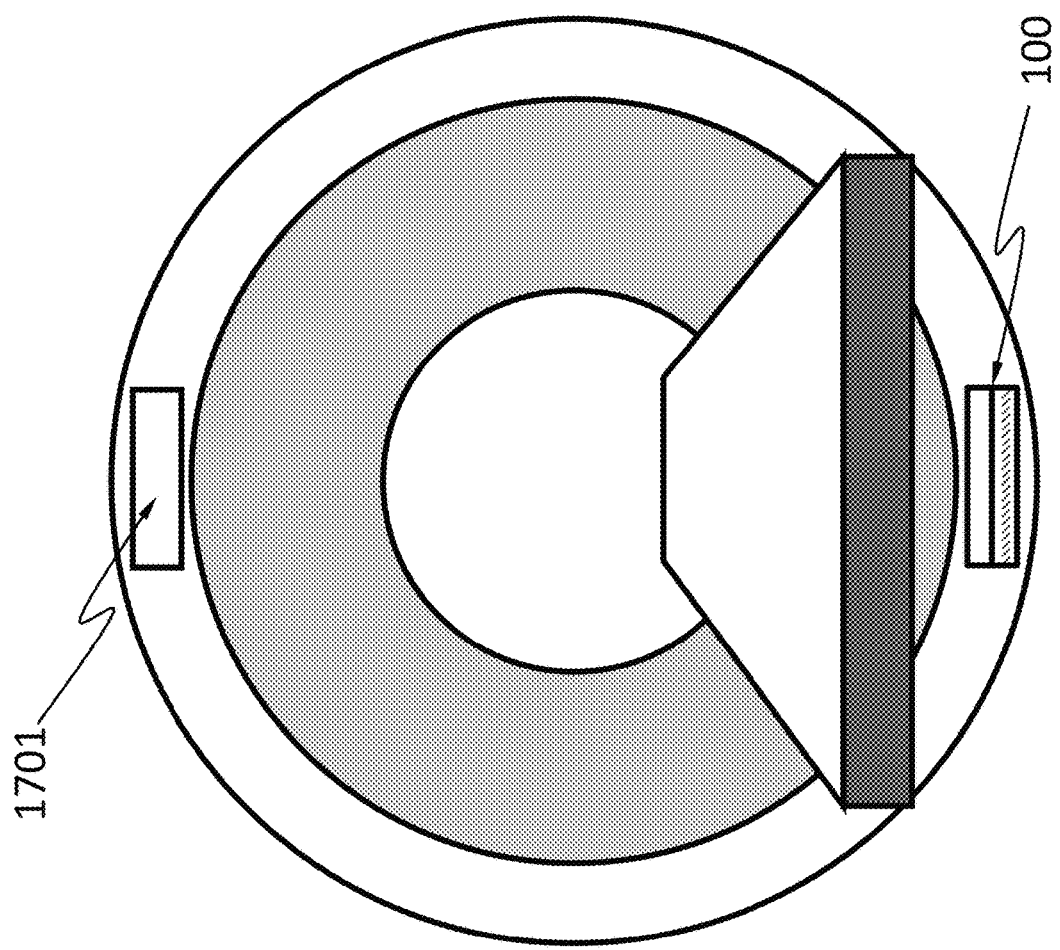

FIG. 13 schematically shows an X-ray computed tomography (X-ray CT) system. The X-ray CT system uses computer-processed X-rays to produce tomographic images (virtual "slices") of specific areas of a scanned object. The tomographic images may be used for diagnostic and therapeutic purposes in various medical disciplines, or for flaw detection, failure analysis, metrology, assembly analysis and reverse engineering. The X-ray CT system comprises the radiation detector 100 described herein and a pulsed radiation source 1701 that emits X-ray. The radiation detector 100 and the pulsed radiation source 1701 may be configured to rotate synchronously along one or more circular or spiral paths.

Figure 14:
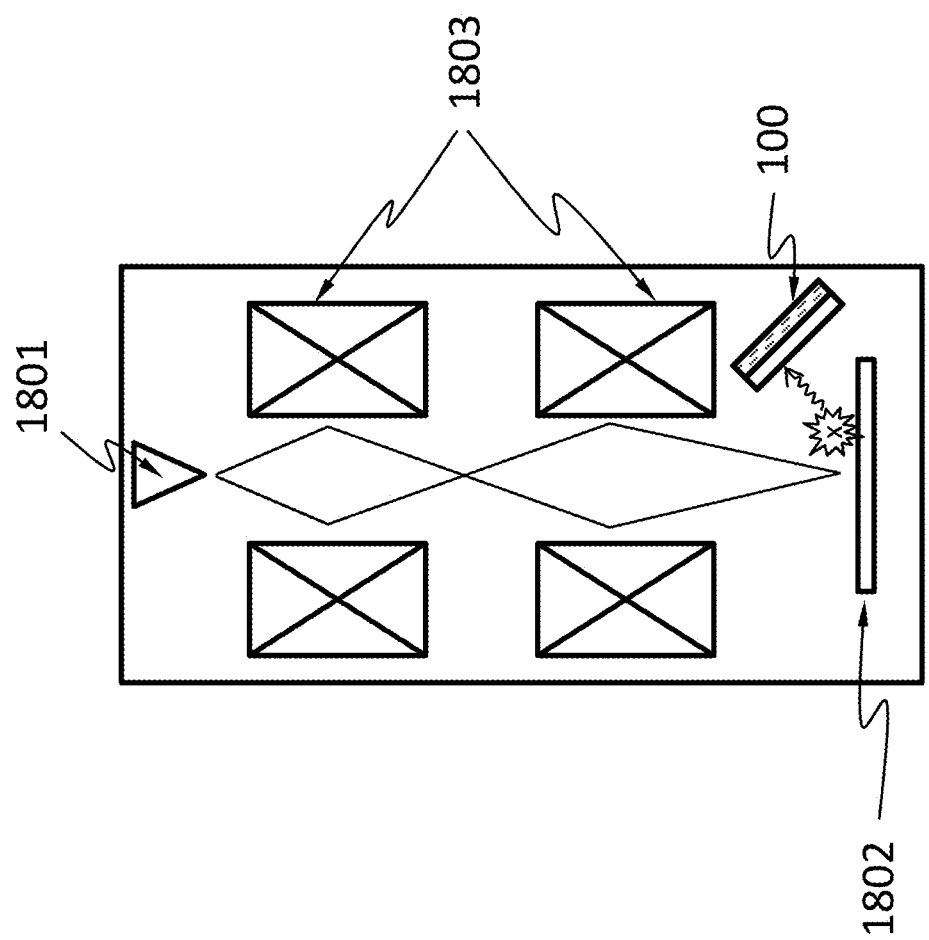

FIG. 14 schematically shows an electron microscope. The electron microscope comprises an electron source 1801 (also called an electron gun) that is configured to emit electrons. The electron source 1801 may have various emission mechanisms such as thermionic, photocathode, cold emission, or plasmas source. The emitted electrons pass through an electronic optical system 1803, which may be configured to shape, accelerate, or focus the electrons. The electrons then reach a sample 1802 and an image detector may form an image therefrom. The electron microscope may comprise the radiation detector 100 described herein, for performing energy-dispersive X-ray spectroscopy (EDS). EDS is an analytical technique used for the elemental analysis or chemical characterization of a sample. When the electrons incident on a sample, they cause emission of characteristic X-rays from the sample. The incident electrons may excite an electron in an inner shell of an atom in the sample, ejecting it from the shell while creating an electron hole where the electron was. An electron from an outer, higher-energy shell then fills the hole, and the difference in energy between the higher-energy shell and the lower energy shell may be released in the form of an X-ray. The number and energy of the X-rays emitted from the sample can be measured by the radiation detector 100.

The radiation detector 100 described here may have other applications such as in an X-ray telescope, X-ray mammography, industrial X-ray defect detection, X-ray microscopy or microradiography, X-ray casting inspection, X-ray non-destructive testing, X-ray weld inspection, X-ray digital subtraction angiography, etc. It may be suitable to use this radiation detector 100 in place of a photographic plate, a photographic film, a PSP plate, an X-ray image intensifier, a scintillator, or an X-ray detector.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A radiation detector, comprising:
pixels arranged in an array, the pixels comprising peripheral pixels at a periphery of the array and interior pixels at an interior of the array, each of the pixels configured to generate an electrical signal on an electrode thereof, upon exposure to a radiation;
an electronic system comprising a controller and a current source;
wherein the controller is configured to cause the current source to provide first compensation to the peripheral pixels for a dark noise of the peripheral pixels and configured to cause the current source to provide second compensation to the interior pixels for a dark noise of the interior pixels, the first compensation and the second compensation being different;
wherein the current source is configured to provide the first compensation by providing a first electric current to the peripheral pixels and to provide the second compensation by providing a second electric current to the interior pixels, the first electric current and the second electric current being different;
wherein the first electric current and the second electric current are different in waveforms thereof, or in frequencies thereof.

2. The radiation detector of claim 1, wherein a magnitude of the first electric current is at least 10 times larger than a magnitude of the second electric current.

3. The radiation detector of claim 1, wherein the radiation is X-ray.

4. The radiation detector of claim 1, wherein each of the pixels comprises a radiation absorption layer and an electrode;
wherein the electronic system further comprises:
a first voltage comparator configured to compare a voltage of the electrode to a first threshold;
a second voltage comparator configured to compare the voltage to a second threshold;
a counter configured to register a number of radiation particles absorbed by the radiation absorption layer;
wherein the controller is configured to start a time delay from a time at which the first voltage comparator determines that an absolute value of the voltage equals or exceeds an absolute value of the first threshold;
wherein the controller is configured to activate the second voltage comparator during the time delay;
wherein the controller is configured to cause the number registered by the counter to increase by one, if the second voltage comparator determines that an absolute value of the voltage equals or exceeds an absolute value of the second threshold.

5. The radiation detector of claim 4, wherein the controller is configured to activate the second voltage comparator at a beginning or expiration of the time delay.

6. The radiation detector of claim 4, further comprising a voltmeter, wherein the controller is configured to cause the voltmeter to measure the voltage upon expiration of the time delay.

7. The radiation detector of claim 6, wherein the controller is configured to determine a radiation particle energy based on a value of the voltage measured upon expiration of the time delay.

8. The radiation detector of claim 4, wherein the controller is configured to connect the electrode to an electrical ground.

9. The radiation detector of claim 4, wherein a rate of change of the voltage is substantially zero at expiration of the time delay.

10. The radiation detector of claim 4, wherein a rate of change of the voltage is substantially non-zero at expiration of the time delay.

11. The radiation detector of claim 1, wherein each of the pixels comprises a diode or a resistor.

12. The radiation detector of claim 1, wherein each of the pixels comprises silicon, germanium, GaAs, CdTe, CdZnTe, or a combination thereof.

13. The radiation detector of claim 1, wherein the radiation detector does not comprise a scintillator.

14. A radiation detector, comprising:
pixels arranged in an array, the pixels comprising peripheral pixels at a periphery of the array and interior pixels at an interior of the array, each of the pixels configured to generate an electrical signal on an electrode thereof, upon exposure to a radiation, each of the pixels comprising a radiation absorption layer and an electrode;
an electronic system comprising:
  a first voltage comparator configured to compare a voltage of the electrode to a first threshold;
  a second voltage comparator configured to compare the voltage to a second threshold;
  a counter configured to register a number of radiation particles absorbed by the radiation absorption layer;
  a controller;
  wherein the controller is configured to start a time delay from a time at which the first voltage comparator determines that an absolute value of the voltage equals or exceeds an absolute value of the first threshold;
  wherein the controller is configured to activate the second voltage comparator during the time delay;
  wherein the controller is configured to cause the number registered by the counter to increase by one, if the second voltage comparator determines that an absolute value of the voltage equals or exceeds an absolute value of the second threshold;
wherein the electronic system is configured to apply different magnitudes of the second threshold for the peripheral pixels and the interior pixels.

15. The radiation detector of claim 14, wherein the controller is configured to activate the second voltage comparator at a beginning or expiration of the time delay.

16. The radiation detector of claim 15, wherein the controller is configured to determine a radiation particle energy based on a value of the voltage measured upon expiration of the time delay.

17. The radiation detector of claim 14, further comprising a voltmeter, wherein the controller is configured to cause the voltmeter to measure the voltage upon expiration of the time delay.

18. The radiation detector of claim 14, wherein the controller is configured to connect the electrode to an electrical ground.

19. The radiation detector of claim 14, wherein a rate of change of the voltage is substantially zero at expiration of the time delay.

20. The radiation detector of claim 14, wherein a rate of change of the voltage is substantially non-zero at expiration of the time delay.

21. The radiation detector of claim 14, wherein the absolute value of the second threshold for the peripheral pixels is higher than the absolute value of the second threshold for the interior pixels.

22. A method of using a radiation detector,
wherein the radiation detector comprises pixels arranged in an array, the pixels comprising peripheral pixels at a periphery of the array and interior pixels at an interior of the array, each of the pixels configured to generate an electrical signal on an electrode thereof, upon exposure to a radiation;
the method comprising:
determining a contribution of a first dark noise in the electrical signals of the peripheral pixels;
determining a contribution of a second dark noise in the electrical signals of the interior pixels;
determining a first compensatory signal based on the contribution of the first dark noise, and a second compensatory signal based on the contribution of the second dark noise; and
compensating the electrical signals of the peripheral pixels for the first dark noise with the first compensatory signal and compensating the electrical signals of the interior pixels for the second dark noise with the second compensatory signal;
wherein the first compensatory signal and the second compensatory signal are different;
wherein the first compensatory signal and the second compensatory signal are different in waveforms thereof, or in frequencies thereof.

23. The method of claim 22, wherein the contribution of the first dark noise or the contribution of the first dark noise is determined by measuring the electrical signal while the radiation detector receives no radiation.

24. The method of claim 22, wherein the first compensatory signal and the second compensatory signal are electric currents.

* * * * *